United States Patent [19]

Voss

[11] Patent Number: 4,648,654
[45] Date of Patent: Mar. 10, 1987

[54] ADJUSTABLE VEHICLE SEAT

[76] Inventor: Hans W. Voss, Rua Tome Portes, 554, 01000 Sao Paulo SP, Brazil

[21] Appl. No.: 581,846

[22] Filed: Feb. 21, 1984

[51] Int. Cl.$^4$ .......................... A47C 1/023; B60N 1/02
[52] U.S. Cl. ..................................... 297/313; 248/395; 297/317; 297/337; 297/346
[58] Field of Search ........ 297/313, 317, 322, 326–329, 297/337, 345, 346, 362; 248/393, 394, 395

[56] References Cited

U.S. PATENT DOCUMENTS

| | | | |
|---|---|---|---|
| 2,025,436 | 12/1935 | Brosset | 297/326 |
| 3,049,329 | 8/1962 | Eddy | 248/394 |
| 3,719,387 | 3/1973 | Boschen et al. | 297/364 X |
| 4,222,607 | 8/1980 | Dimmock | 297/317 X |
| 4,371,206 | 2/1983 | Johnson, Jr. | 297/364 X |
| 4,422,611 | 12/1983 | Katsuda | 248/394 X |

FOREIGN PATENT DOCUMENTS

| | | | |
|---|---|---|---|
| 2816191 | 4/1979 | Fed. Rep. of Germany | 297/317 |
| 1113419 | 3/1956 | France | 297/313 |
| 1276275 | 6/1972 | United Kingdom | 297/362 |

Primary Examiner—Kenneth J. Dorner
Assistant Examiner—Peter R. Brown
Attorney, Agent, or Firm—Beveridge, DeGrandi & Weilacher

[57] ABSTRACT

The present invention refers to an adjustable seat, particularly for use in buses and trucks. There is described an adjustable seat having a seat portion and a back portion, which permits the correct simultaneous positioning of the back, arms, and legs of a driver irrespective of his stature. The seat includes an adjustable seat portion which may be moved longitudinally towards or away from the seat back portion, such longitudinal movement being accompanied by a simultaneous rotation of the seat portion about a first transverse axis, the angle between the seat portion and the back portion increasing or decreasing as a result of longitudinal motion of the seat portion. There is also described a second mechanism which allows a limited angular rotation of the seat portion about a second transverse axis.

26 Claims, 11 Drawing Figures

ADJUSTABLE VEHICLE SEAT

The present invention refers to an adjustable seat, particularly for use in trucks and buses.

Various types of adjustable driver's seats have been proposed for use in vehicles, with a view to accommodating drivers of various different statures. Thus, known seat arrangaments permit, for example, the adjustment of the angle of the seat back, adjustment of distance between the seat and the steering wheel and pedals, adjustment of the height of the seat, and longitudinal movement of the seat part in relation to the seat back.

However, detailed studies and computer simulations have shown that depending on the driver's height or more particularly, on the length of the driver's legs and considering the pedals and steering wheel as fixed points, the seat should be angularly variable.

It is thus a disadvantage of the existing seat arrangements that in some cases it is not possible to find a position for the seat which simultaneously allows the feet to be confortably positioned on the pedals, the arms to be confortably positioned on the steering wheel, and for the driver's back to be in an approximately vertical position. In such cases, the driver is compelled to assume a position which is anatomically unsuitable.

The object of the present invention is therefore to provide an adjustable seat which permits the legs, arms and back of the driver to occupy anatomically suitable positions in respect of the driver's height or leg length.

This objective is achieved, in accordance with the invention, by providing a first translation and rotation means which allows longitudinal movement of the seat portion relative to the back portion, simultaneous with a limited angular movement of the seat portion in relation to a first transverse rotation axis, the angle between the seat portion and the back portion diminishing or increasing as the seat portion is moved forward or backwards. It is equally foreseen that a second rotation device may be provided to allow limited angular movement of the seat portion about a second axis of rotation transverse to the seat portion.

The invention will now be explained in more detail, with reference to a non-limiting example shown in the drawings, in which.

Figure 1:
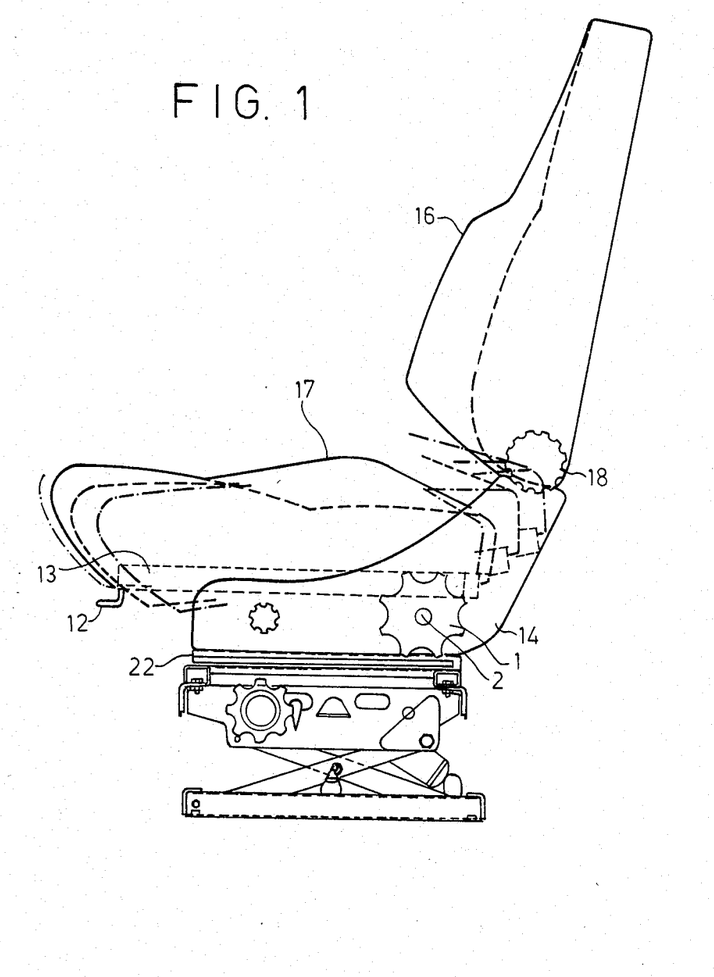
FIG. 1 is a left view of a driver's seat.

Referring now to the drawings, FIG. 1 shows a general view of the adjustable seat according to the present invention, including a back portion 16 and a seat portion 17 mounted on a base structure 13 and having side panels 14. The elements by which the seat is adjusted are as follows:

A lever 12 for the combined longitudinal and angular movement of the seat portion 17, this lever being fixed to the base structure 13, preferably by welding;

A rotatable adjusting knob 1, having a locking button 2, for lifting and lowering the rear part of the seat portion 17;

A regulator 18, of known type, for adjusting the inclination of the back portion 16 of the seat.

The seat is further provided with other known adjusting means, for example the means for adjusting its height and the rails 22 for longitudinal movement.

Figure 2:
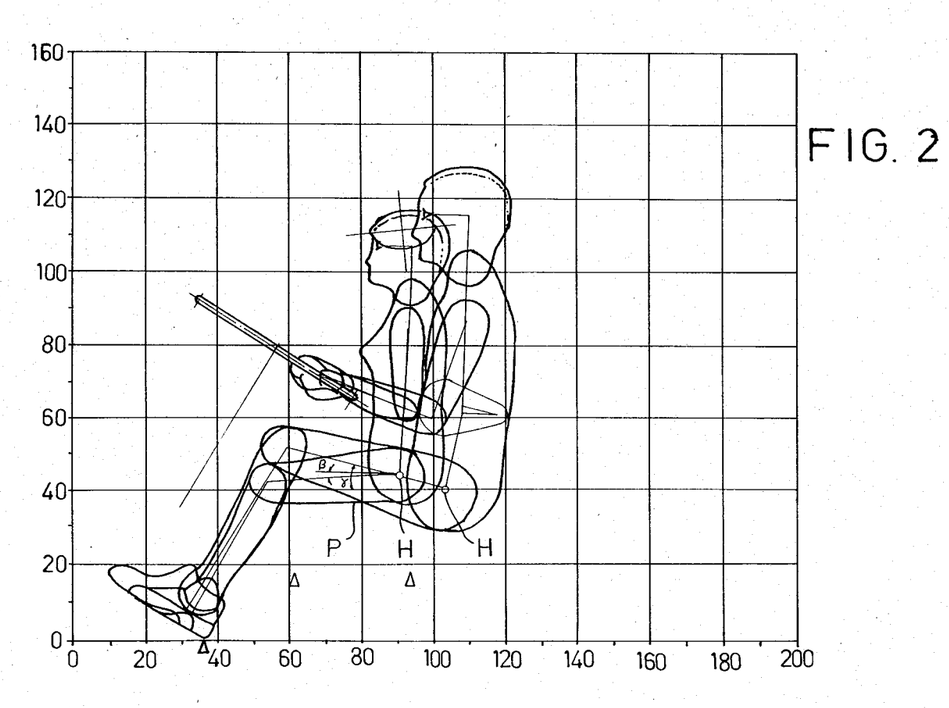
FIG. 2 is a simulation of the ideal positions of two persons of different stature.

FIG. 2 shows the ideal driving positions for two persons of differing stature, the figures being shown superimposed. The steering wheel and the pedals are considered as fixed points, the ideal position relative to the steering wheel being that in which the forearm is slightly upwardly inclined to the horizontal, in the direction from the elbow to the wrist. It is also apparent that the inclination of the line joining the knee to the point H of the hip is variable from a negative inclination $\beta$ in the case of the smaller figure to a positive inclination $\alpha$ in the case of the taller. Therefore, to afford a correct support, it is necessary not only that the length of the seat portion be variable, so as to extend from below the knees to the back of the seat, but also the inclination of the seat portion should be adjustable. In order to maintain the forearm in the slightly ascending position described above, than the point H must be raised or lowered in accordance with the length of the driver's body.

It is thus clear that the optimum height of point H is a function principally of the length of the driver's body, while the optimum height for the center of articulation of the knees is a function solely of the length of the legs. It is also clear from the drawing that there exists a point P which indicates a relative coincidence of height for the lower part of the thigh in persons of differing stature. It is therefore deduced that the axis of rotation of the seat should be positioned below or approximately below this point P, in order to avoid a significant variation of height at this point during adjustment of the inclination of the seat portion.

Figure 3:
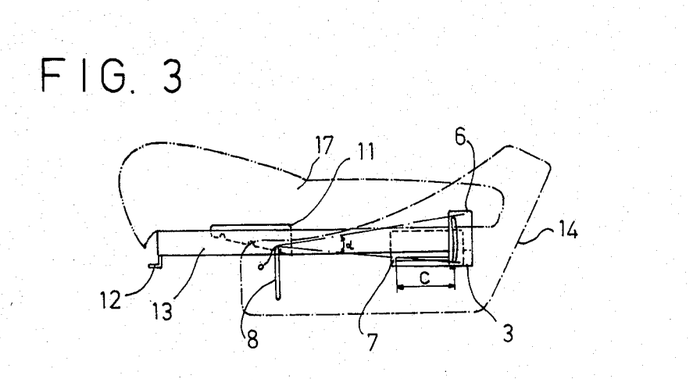
FIG. 3 is a schematic view of the components of the adjusting mechanism.

FIG. 3 shows a simplified view of the adjusting components in accordance with the invention. Here, both the side panel 14 and the seat portion 17 are shown in chain lines for ease of visualization. Plates 7 and 11, as well as lever 12, are fixed to the base structure 13, while the rod 8 and plate 6 are fixed to the side panel 14. While the parts are fixed preferably by welding, it is also possible to use rivets, screws bolts or the like. Guide pins 3 and rod 8 constitute the support points for the seat portion 17.

Once the seat back portion (not shown) is fixed to the side panel 14, then to move the seat portion 17 relative to the back the lever 12 is lifted. This causes the seat portion to turn about guide pin 3, and rod 8 is removed from its position of engagement in plate 11 allowing the seat to be moved to a new position. The maximum movement is equal to the length C of the longitudinal slot in guide plate 7, in which the guide pin 3 slides. It should be emphasised that due to the inclination of the lower face of plate 11, movement of the seat portion towards the rear causes the lowering of the front part of the seat, as shown in FIG. 2. This makes the seat more suitable for smaller drivers. In this way, adjusting the length of the seat portion relative to the back portion automatically produces an inclination of the seat portion more appropriate to the driver's stature. As has already been mentioned, the correct positioning of the arms depends on the length of the driver's body and therefore the rear of the seat portion may have its height additionally adjusted by means of adjusting knob 1 (FIG. 1) and a mechanism not shown in FIG. 3 which moves the guide pin 3 in the semi-circular slot formed in guide plate 6. The center of the circle of which the slot is a part is situated at the upper extremity of rod 8, at point O. This is approximately below point P (FIG. 2).

The seat portion may thus be rotated an angle α about the point O.

Figure 3A:
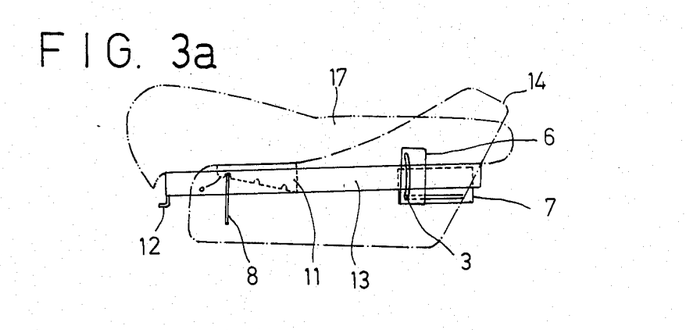
FIG. 3a is a view similar to FIG. 3 in an alternative position of the seat.
Figure 3B:
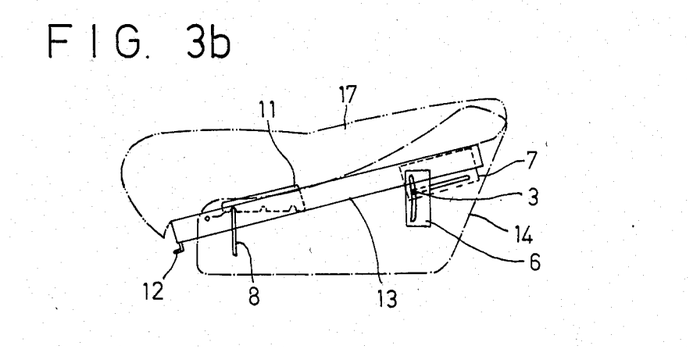
FIG. 3b is a view similar to FIG. 3 in a further alternative position.

In FIG. 3a the seat portion is shown moved to the rear, with the rod 8 engaged in a second position in the plate 11. The seat portion has a different inclination, which may be further accentuated on adjusting the guide pin 3 to a new position as shown in FIG. 3b.

Figure 4:
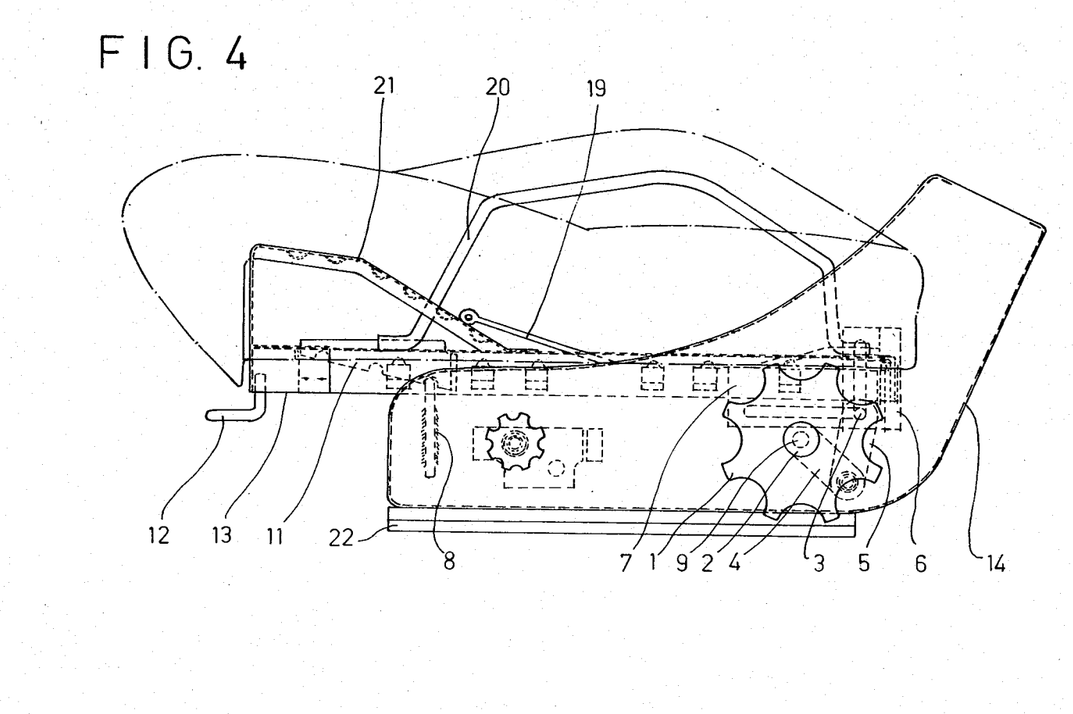
FIG. 4 is left side view of the seat part, showing the internal construction.

FIG. 4 shows the seat of FIG. 3 in a more detailed fashion, showing some of the known components, such as the flexible members 19 which support a layer of foam, and which by virtue of their flexibility allow a smaller quantity of foam to be used; the frames 20 (one on each side) which form side supports to the seat portion providing additional security against the driver sliding sideways in the seat; the platform 21 which provides a better accommodation of the driver at the front part of the seat portion and which, together with the use of a safty harness impedes forward motion of the driver in cases of rapid deceleration; and the rails 22 for longitudinal adjustment of the entire seat.

In accordance with the invention two links 4 and 5 are pivoted together, link 4 being fixed radially in relation to shaft 9, which in turn may be rotated by adjusting knob 1. Link 5 is provided with a guide pin 3 at one of its extremities and its other extremity is pivoted to the end of link, 4 remote from shaft 9.

Figure 5:
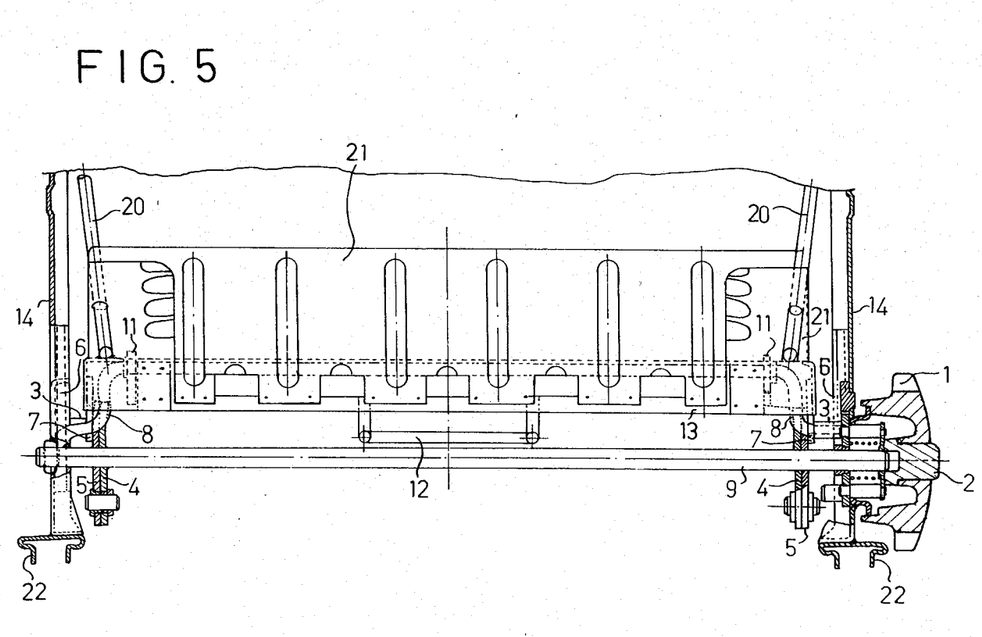
FIG. 5 is a front view, partially in section, of the seat part.

FIG. 5 is a front view of the seat portion, in which the symmetry of the components in relation to a central vertical plane may be observed. Thus, on the right and the left sides, respectively, there is provided a guide pin 3 fixed to a link 5, a link 4 fixed to shaft 9, a guide plate 6 and a guide plate 7, a supporting plate 11, and a side panel 14. The fixed rod 8 and the rotating shaft 9 extend from one side to the other, the adjusting knob 1 being mounted at one end of shaft 9 as will be described below.

The adjusting knob 1 is provided to adjust the height of the rear part of the seat portion. As may be seen from FIG. 6, the adjusting knob 1 is fixed to the periphery of a cup-shaped plate 15, which in turn is welded to the shaft 9. Four circular appertures penetrate the cup-shaped plate 15, and are fixed at one of their respective ends to a circular collar 10 which lies within the adjusting knob 1 and is axially slidable on shaft 9. The other ends of pins 23 are fixed to a toothed wheel 25. Locking button 2, slidable in the adjusting knob 1, abuts against the collar 10. A semi-circular toothed plate 26 cooperates with the toothed wheel 25, plate 26 being fixed in relation to the side panel 14, preferably by being welded thereto.

Figure 6:
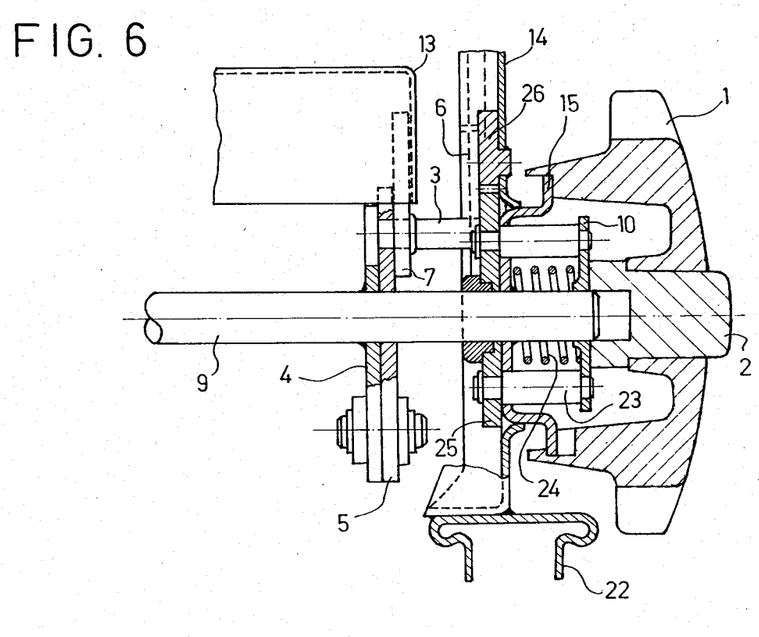
FIG. 6 is an enlarged view of the adjusting knob and its components shown in FIG. 5.
Figure 7:
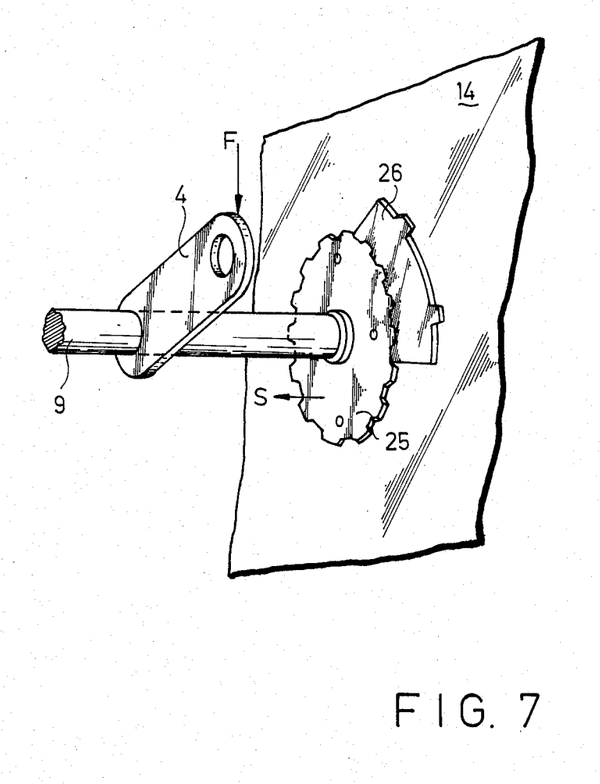
FIG. 7 is a partial perspective view of the mechanism of FIG. 6.

Thus, in the position indicated in FIGS. 6 and 7, shaft 9 is locked, maintaining guide pin 3 in a determined position. On pressing the button 2, against the force of return spring 24, the toothed wheel 25 is displaced in the direction of arrow S (FIG. 7) out of its position of engagement with toothed plate 26. This frees the shaft 9 to rotate, and via links 4 and 5 the position of guide pin 3 may be changed, by rotating the adjusting knob 1 with the button 2 pressed in. Releasing the locking button 2, the return spring 24 brings toothed wheel 25 back into engagement with toothed plate 26, preventing further rotation.

The adjusting knob 1 is so shaped as to permit comfortable operation by the driver, rotating the knob with the fingers while pressing the locking button 2 with the palm of the hand. Another advantage of this system consists in the fact that it is extremely difficult to press the locking button 2 without first having a firm grip on the adjusting knob 1, as, as may be seen from FIG. 7, the weight of the driver on the seat portion produces a force F on the link 4, which in turn produces a torque on shaft 9. This torque is transmitted to the toothed wheel 25, forcing its teeth against the teeth of the plate 26, and thus producing a large static friction between these parts. It is therefore necessary that this torque be relieved by appropriate pressure on the adjusting knob. By gripping the adjusting knob in this way, a rapid fall of the seat portion when the locking button is pressed is avoided.

Figure 8:
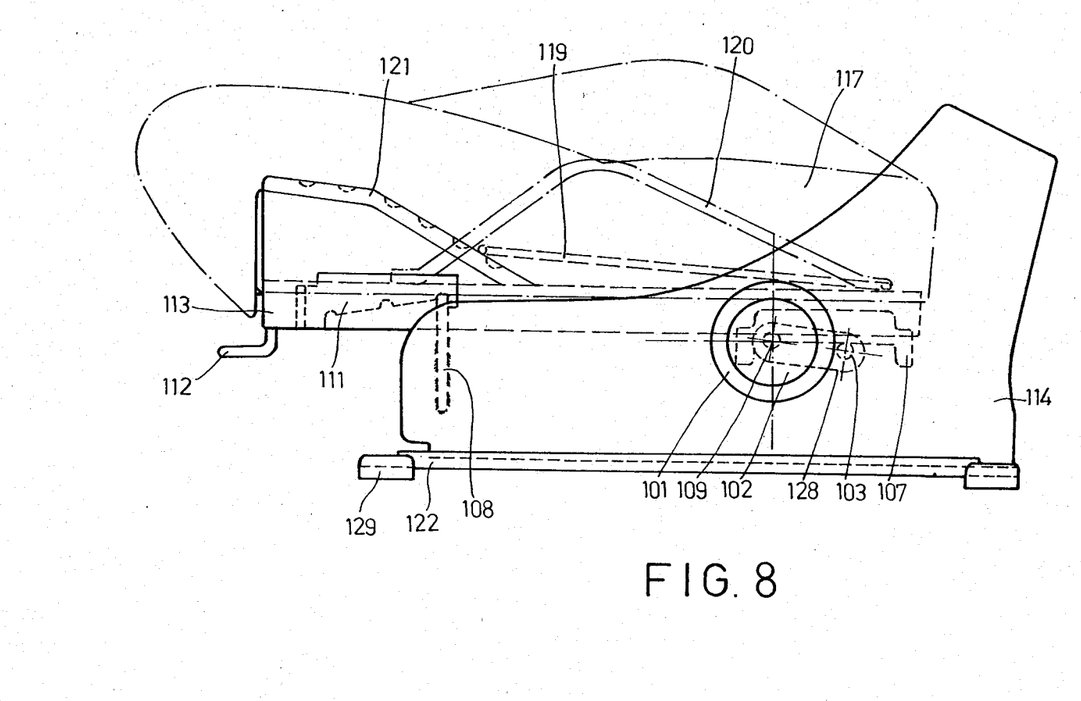
FIG. 8 is a view similar to FIG. 4, showing some modifications.
Figure 9:
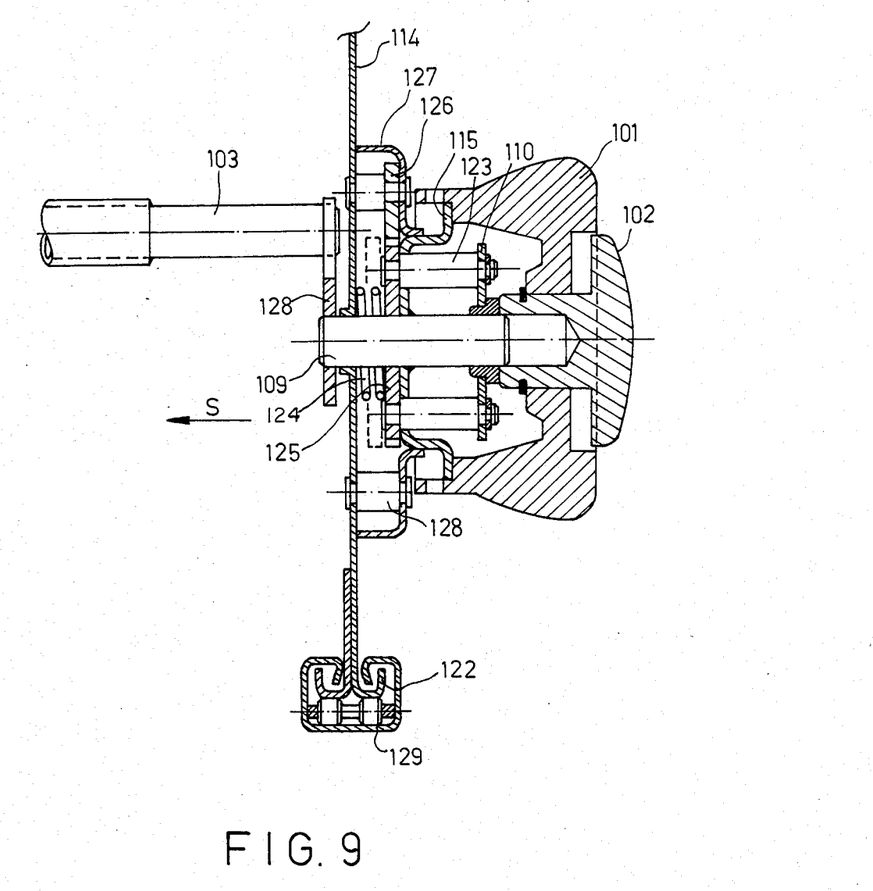
FIG. 9 is an enlarged front view of partial section of the adjusting knob and its components, according to FIG. 8.

In FIGS. 8 and 9, which show a modified seat portion and operating mechanism, respectively, the parts which correspond to those parts shown in FIGS. 4 and 6 are designated by their previous reference numerals augmented by 100.

FIG. 8 shows a second example of the seat portion, in which the supporting plate 111 has its lower surface inclined upwardly in the direction towards the rear of the seat portion 117, i.e. its inclination is in the opposite direction to that of supporting plate 11 of FIG. 4. Supporting plate 111 has, like supporting plate 11, recesses in which a rod 108 fixed to the side panels 114 of the seat portion 117 may engage.

This configuration is particularly suitable for vehicle seats having a height regulating mechanism. If the seat is not equipped with this mechanism, then the supporting plate should have the inclination shown in FIG. 4.

Other modifications are clearly shown in FIG. 9. In this example, the supporting element which cooperates with the flat supporting surface 107 is a shaft 103 transverse to the seat portion 117, extending parallel to but spaced from the stub shaft 109. A crank arm 128 connects stub shaft 109 to transverse shaft 103. Stub shaft 109 is connected to the adjusting knob 101 in a manner similar to the previous example, but the entire adjusting knob assembly, including the adjusting knob 101 and the locking button 102, is held away from side panel 114 by means of a spacer plate 127. This plate 127 is fixed to the side panel 114 in parallel spaced relationship thereto. The shaft 109 is mounted for rotation in coaxial apertures in the side panel 114 and spacer plate 127. Spacer plate 127 is cup-shaped, with its wider end adjacent side panel 114 and its narrower end adjacent adjusting knob 101. In the space between the spacing plate and the side panel, are mounted a toothed wheel 125 and a toothed plate 126, cooperating in the manner described in relation to the FIG. 4 embodiment. The toothed wheel 125 is rotationally fixed and axially slidable on the shaft 109 so that it may be moved from the first position shown in solid lines where it engages the toothed plate 126, to a second position shown in broken lines where it is disengaged from the toothed plate 126. The wheel 125 is urged by spring 124 toward the engaged position, but the manually operable button 102 provides a means for displacing the wheel 125 from its engaged first position to its disengaged second position. When the toothed wheel 125 is in its disengaged position, the shaft 109 may be rotated by means of the knob 101 which serves as a grippable handle. The apertures in the cup shaped plate 115 on knob 101 receive the pins 123 on the wheel in order to transmit the rotational movement of the knob 101 to the toothed wheel 125.

It is observed that the rails 122 and rollers 129 for longitudinal adjustment of the entire seat assembly are shown at the lower part of FIG. 9, the rails being formed by an upwardly open channel-shaped lip at the lower edge of side panel 114, and an upwardly open channel section welded to side panel 114.

I claim:

1. An adjustable vehicle seat having a back portion and a seat portion, comprising a first manually operable adjusting means simultaneously and obligatorily providing both longitudinal movement of the seat portion relative to the back portion and a limited angular movement of the seat portion in relation to a first transverse axis of rotation, said first adjusting means being operable to produce said limited angular movement in response to said longitudinal movement of the seat portion, the angle between the seat portion and the back portion decreasing or increasing in response to longitudinal movement of the seat portion with respect to the back portion, and a second adjusting means which is manually rotatable, said second adjusting means providing, in response to manual rotation thereof, a limited angular movement of the seat portion about a second axis of rotation transverse to the seat portion, said second adjusting means being operable when the first adjusting means maintains the seat portion in a plurality of longitudinal positions.

2. An adjustable seat in accordance with claim 1, characterised in that the said first transverse rotation axis (3, 103) is located at the rear part of the seat portion (17, 117).

3. An adjustable seat in accordance with claim 2, characterised by the fact that the rotation axis (0) of said second adjusting means is positioned forward of the said first transverse rotation axis (3, 103).

4. An adjustable seat in accordance with claim 1, characterised in that the said first adjusting means comprises a substantially horizontal support surface (7, 107) and an inclined support surface (11, 111) to obtain simultaneous angular and longitudinal movement of the seat portion (17, 117), each of the said surfaces cooperating with a second support element (3, 103, 8, 108).

5. An adjustable seat according to claim 4, characterised in that the inclined support surface (11) is inclined downwardly towards the rear of the seat portion (17).

6. An adjustable seat according to claim 5, characterized in that the horizontal support surface is provided by a guide plate having a longitudinal slot and the inclined support surface is provided by a supporting plate having an inclined edge.

7. An adjustable seat according to claim 6, characterized in that the supporting plate is positioned forward of the guide plate.

8. An adjustable seat in accordance with claim 6, characterized in that the supporting plate and the guide plate are fixed to a base structure of the seat portion.

9. An adjustable seat according to claim 6, characterized in that the lower edge of the supporting plate is provided with recesses in which a transverse rod may engage, the transverse rod being fixed to side panels disposed on either side of the seat portion and supporting the front of the seat portion, and in that a horizontal guide element is slidably received in the longitudinal slot in the guide plate to support the rear of the seat portion.

10. An adjustable seat in accordance with claim 4, characterised in that the inclined support surface (111) is inclined upwardly towards the rear of the seat portion (117).

11. An adjustable seat according to claim 10, characterised in that the horizontal support surface is provided by a guide plate (7, 107) having a longitudinal slot and the inclined support surface is provided by a supporting plate (11, 111) having an inclined edge.

12. An adjustable seat according to claim 11, characterised in that the supporting plate (11, 111) is positioned forward of the guide plate (7, 107).

13. An adjustable seat in accordance with claim 11, characterised in that the supporting plate (11, 111) and the guide plate (7, 107) are fixed to a base structure (13, 113) of the seat portion (17, 117).

14. An adjustable seat according to claim 11, characterised in that the lower edge of the supporting plate (11, 111) is provided with recesses in which a transverse rod (8, 108) may engage, the transverse rod (8, 108) being fixed to side panels (14, 114) disposed on either side of the seat portion (17, 117) and supporting the front of seat portion (17, 117), and in that a horizontal guide element (3, 103) is slidably received in the longitudinal slot in the guide plate (7, 107) to support the rear of seat portion (17, 117).

15. An adjustable seat according to claim 1, characterised in that the second adjusting means includes a fixed vertically extending guide surface lying in contact with a guide element (3, 103) which may be moved to raise or lower the rear of seat portion (17, 117).

16. An adjustable seat according to claim 1, characterised in that the second adjusting means comprises means to raise or lower selectively the rear part of the seat portion (17, 117).

17. An adjustable seat according to claim 16, characterized in that the vertically extending guide surface is arcuate, having its centre of rotation on the first transverse axis of rotation (0), and is formed by an arcuate slot provided in a guide plate (6), a side panel fixed to the guide plate, and a guide pin which is slidably received in the slot.

18. An adjustable seat in accordance with claim 17, characterised in that a rotatable shaft (9) extends laterally below the rear of the seat portion (17), the guide element (3) being movable vertically by rotation of an adjusting knob (1) fixed to the shaft (9).

19. An adjusting seat in accordance with claim 18, characterised in that two links (4, 5), connect the shaft to the guide element, the guide element (3) being fixed to one end of one the links (5), the other end of the one link (5) being fixed to one end of the second link (4), and the other end of the second link (4) being fixed to shaft (9).

20. An adjustable seat in accordance with claim 18, characterised by the fact that the shaft (9) may be locked in any one of a plurality of angular positions by means of a toothed wheel (25) mounted to the shaft to rotate therewith but be axially slidable relative thereto, the toothed wheel (25) being selectively engageable with a fixed arcuate toothed plate (26).

21. An adjustable seat according to claim 20, in which the adjusting knob (1) is fixed to the periphery of a cup-shaped plate (15) fixed to the shaft (9), the toothed wheel (25) being coaxial with the shaft (9) and being supported by a plurality of pins (23) extending from the toothed wheel (25) through apertures in the cup-shaped plate (15) to terminate in a collar (10) coaxial with and slidable on the shaft (9), resilient means (24) being provided to urge collar (10) axially with respect to said shaft (9) (109) so that the toothed wheel (25) engages the fixed toothed plate (25), and means (2) being provided to selectively displace collar (10) against the action of the resilient means (24).

22. An adjustable seat in accordance with claim 21, characterised in that the resilient means (24) is a helical spring.

23. An adjustable seat in accordance with claim 22, characterised in that the toothed wheel (125) and the toothed plate (126) are positioned between a side panel (114) of the seat, and a spacer plate (127) fixed to the outer face of the side panel (114).

24. An adjustable seat in accordance with claim 16 characterised in that transverse stub shafts (109) are coaxially mounted in side panels (114), disposed on either side of seat portion (17, 117), and crank arms (128) join the stub shafts (109) to a transverse shaft (103) parallel to and spaced from the axis of the stub shafts (109), a plane supporting surface (107) of the seat portion (117) cooperating with shaft (103) to support the rear of the seat portion (117).

25. An adjustable seat in accordance with claim 24, characterized by the fact that one of the stub shafts (109) is lockable in any one of a plurality of angular positions by means of a toothed wheel and a fixed arcuate toothed plate, said toothed wheel being rotationally fixed to and axially slidable on said stub shaft, said toothed wheel being selectively engageable with said fixed arcuate toothed plate.

26. An adjustable vehicle seat in accordance with claim 1, and a vehicle having a steering wheel and foot pedals positioned for operation by a driver who sits in said seat.

* * * * *